Patented Oct. 27, 1942

2,300,352

UNITED STATES PATENT OFFICE 2,300,352

FLEXIBLE CEMENT

Roland D. Earle, Cohasset, Mass.

No Drawing. Application February 14, 1940,
Serial No. 318,843

2 Claims. (Cl. 260—5)

This invention relates to the manufacture of flexible adhesives or cements, and especially to cements made from synthetic rubber, of which polymerized chloroprene, a product which can be obtained commercially under the trade name "neoprene," is an example.

Polymerized chloroprene cement has heretofore been made by dissolving the chloroprene in a suitable solvent, such as a mixture of equal parts of benzol and trichlorethylene. A cement of this type is described in the U. S. Patent No. 2,061,296, November 17, 1936. In making a cement such as described in said patent, it has been necessary to use as much as three pounds of the neoprene for each gallon of cement in order to produce a satisfactory cement for general use, for if a less quantity of neoprene is used, the resulting cement will lack the characteristics which it should have in order to provide a suitable surface bonding film when it is applied to the surface of fabrics or to the surface of many grades of leather that are used in making shoes, and when so applied, it will sink out of sight in the fabric or leather without leaving on the surface thereof any appreciable bonding film.

Neoprene is at present very expensive as compared to rubber, and because of the necessity of using approximately three pounds of neoprene for each gallon of cement, the price at which neoprene cement as heretofore made can be profitably sold is very much higher than that paid for good rubber cement.

Neoprene cement, however, is superior to rubber cement for many purposes where a strong permanent bond is desired.

The bonding strength of a cement is determined largely by the following three factors:

(1) The depth to which the cement penetrates material when applied to the surface thereof and which gives anchorage to the bond.

(2) The surface bonding film which remains on the surface of the material when cement is applied thereto, which film forms the junction or union between two surfaces to be laminated together.

(3) The actual physical strength of the bonding material.

If a cement does not penetrate sufficiently into the material to which it is applied, the bond between two surfaces cemented together will be relatively poor because the cement hasn't sufficient anchorage in the material. On the other hand, no matter how great the depth of penetration and how good the anchorage, a poor bond will result if, when the cement is applied to the surfaces to be cemented together, an insufficient surface bonding film remains on said surface.

The surface bonding film which is deposited from many rubber cements tends often to deteriorate through oxidation, thus weakening the union between the parts cemented together. The surface bonding film deposited from neoprene cement does not oxidize, and, therefore, a neoprene cement has the advantage that it will retain its full bonding strength indefinitely, which is an important advantage.

It is one of the objects of my present invention to provide a neoprene or other synthetic rubber cement which will have the desired depth of penetration and a proper surface bonding film but which requires considerably less neoprene for making any given quantity of cement than has heretofore been thought possible. In fact, I have found that a cement having a given surface-film-forming characteristic and power of penetration can be made according to my invention by using only about one half the amount of neoprene per gallon of cement that is required to make a neoprene cement by methods heretofore practiced having the same film-forming characteristics and penetrative ability. In other words, neoprene cement embodying my invention in which only one and one-half pounds of neoprene are used for each gallon of cement will produce as satisfactory a surface bonding film and will have as great capacity for penetrating the material to which it is applied as a neoprene cement made according to methods heretofore practiced and containing approximately three pounds of neoprene to the gallon.

Since neoprene is the expensive ingredient of the cement, it follows that my improved cement can be made very much cheaper than neoprene cement as generally made.

My improved cement is based on the discovery that if a relatively small quantity of a rubber solution formed by dissolving rubber in a liquid which is a solvent for rubber but is a non-solvent for neoprene, is dispersed in a neoprene solution, i. e., a solvent for neoprene in which neoprene has been dissolved, the resulting dispersion when applied to the surface of a fabric or leather or other similar material will have much greater surface film-forming characteristics than the same neoprene solution without the presence of the non-solvent for neoprene carrying the rubber constituent, and that the addition of such non-solvent to the neoprene solution will produce no tendency for the neoprene to separate from its solvent such as usually occurs when a non-solvent for neoprene is added to a neoprene solution.

Accordingly, in making my cement, I first prepare a neoprene solution by dissolving neoprene in a suitable solvent therefor, and then I disperse in the neoprene solution a small quantity of a solution formed by dissolving a relatively small amount of rubber in a rubber solvent which is a non-solvent of neoprene, thereby forming a dispersion of which the neoprene solution constitutes the continuous phase or dispersion medium and the non-solvent of neoprene with the rubber dissolved therein constitutes the dispersed phase.

Generally speaking, coal tar distillates such as benzol, toluol, xylol, etc., which are sometimes referred to as aromatic solvents, are suitable solvents of neoprene as is also trichloroethylene, while petroleum distillates such as petroleum naphtha, etc., are non-solvents for neoprene but are solvents for rubber and balata. I have found that the product which is sold commonly under the trade name of "Solvesso No. 1" is also a solvent for neoprene.

A typical formula by which my improved cement may be made is as follows:

|  | Ounces |
|---|---|
| Neoprene | 24 (1½ lbs.) |
| Crude rubber | 2 |
| Petroleum naphtha | 14 | and sufficient solvent for neoprene to make one gallon.

If desired, a small quantity (5%, for instance) of some compounding ingredient or ingredients such as magnesium oxide or zinc oxide may be added to the cement to help in the subsequent curing threof.

In making the cement according to the above formula, a neoprene solution is first formed by dissolving neoprene in a solvent therefor in approximately the proportions of one and one-half pounds of neoprene to approximately one gallon of solvent, and a second solution is formed by dissolving crude rubber or other rubber-like substance in petroleum naphtha or some other suitable non-solvent of neoprene in the proportion of substantially two ounces of rubber or rubber-like substance to fourteen ounces of the petroleum naphtha or other non-solvent of neoprene, or, in other words, in the proportion of one part by weight of rubber or rubber-like substance to seven parts by weight of the petroleum naphtha or other non-solvent of neoprene, and then the latter solution (i. e., the rubber solution) is dispersed in the neoprene solution by means of a suitable mixing equipment and in approximately the proportions set forth in the above formula, that is, approximately one part by weight of the rubber solution to seven parts by weight of the neoprene solution.

A microscopic examination of a cement embodying my invention shows the presence in the dispersion of minute microscopic particles or globules of the non-solvent having the rubber dissolved therein, thus indicating that in such dispersion the colloidal solution of neoprene is in continuous phase and so constitutes the dispersion medium, while the rubber solution is in dispersed phase. When the cement is applied to the surface of material that is at all porous, the cement penetrates the material to a greater or less extent, and during such penetration the minute particles or globules of non-solvent tend to block up the minute spaces or voids existing in the porous material, thus retarding the penetrative action of the cement and increasing the proportion thereof which remains on the surface of the material to form a surface bonding film.

Because of this action, an excellent cement with good penetrating and surface-film-forming qualities can be made in accordance with my invention by using about one half of the amount of neoprene per gallon of cement that has heretofore been thought necessary to make a satisfactory neoprene cement. A neoprene cement such as has heretofore been made but containing the relatively small amount of neoprene to the gallon which I use in making my cement would have the characteristic that when applied to a surface of fabric or upper leather, it would sink out of sight in the material and leave no appreciable bonding film on the surface. But the dispersion in such neoprene solution containing the relatively small amount of neoprene of the petroleum naphtha having a small amount of crude-rubber or other suitable rubber-like substance dissolved therein will produce a cement that will penetrate sufficiently into the leather or fabric to provide an excellent anchorage and at the same time will deposit a perfect bonding film on the surface of such material.

When a cement embodying my invention has been applied to any surface and has been allowed to dry by the evaporation of the solvents in the cement, the resulting bonding film on the surface of the material will not be tacky to any appreciable extent, but nevertheless, such film is in the nature of a pressure-responsive adhesive since two surfaces carrying such films may be firmly united by simply pressing them together. Hence, my cement can be used for various purposes, such as attaching soles to shoe bottoms or uniting two laminations of leather, fabric, etc., by simply applying a coating of my improved cement to the two surfaces to be cemented together, and allowing the cement to dry, and after the cement has dried, bringing the cement-coated surfaces into contact and applying pressure thereto. Such pressure will result in intimately uniting or welding the two films together, and as each film is thoroughly anchored in the material to which it is applied, a superior bond between the two surfaces will result.

Furthermore, I desire it to be understood that while specific proportions have been given in the above formula, yet the invention is not limited to these exact quantities, as the relative amounts of the different ingredients may be varied somewhat without in any way departing from the invention.

The characteristics which a cement should have and the amount of neoprene necessary to use in order to enable the cement to function correctly, depends upon the character of the material with which it is to be used. If the cement is to be used for cementing together laminations of highly porous material, it would be necessary to use a greater amount of neoprene per gallon of cement in order to obtain a surface bonding film, than if the cement is used for cementing together laminations of material having a low degree of porosity, and while I have given above a typical formula for a cement embodying my invention, yet I wish to state again that the percentage of neoprene in the cement may be increased or decreased as necessary to produce a cement suitable for the use to which it is to be put. In any event, however, a cement embodying my invention and adapted for some particular use can be produced by using only about one half the amount of neoprene which would be required for making a cement by methods heretofore practiced and adapted to such use.

While I prefer to use synthetic rubber-like material in the form of neoprene for making my cement, yet any other suitable synthetic rubber-like material may be used, the invention involving the dissolving of such synthetic rubber-like material in a solvent therefor, and then mixing with said solution, a small quantity of another solution formed by dissolving rubber in petroleum naphtha or some other liquid which is a solvent for rubber but is a non-solvent for neoprene, thereby to form a dispersion in which the continuous phase or dispersion medium is the neoprene solution and the dispersed phase comprises microscopic droplets of rubber dissolved in a petroleum distillate which is a non-solvent of the neoprene, and in which the continuous and dispersed phases are present in the dispersion in the proportion of approximately seven parts by weight of the continuous phase and one part by weight of the dispersed phase. In my improved cement, these microscopic droplets which constitute the dispersed phase retain their identity as droplets and when the cement is spread on a surface which is at all porous, said droplets tend to block up the minute spaces or voids existing in the material on which the cement is spread, thereby retarding the tendency of the neoprene solution to penetrate the material with the result that an increased proportion of the neoprene remains on the surface of the material to form a surface bonding film.

I claim:

1. A cement in the form of a dispersion in which the continuous phase or dispersion medium is polymerized chloroprene dissolved in an aromatic solvent therefor in the proportion of approximately 1½ pounds of polymerized chloroprene to one gallon of aromatic solvent, and the dispersed phase comprises microscopic droplets of rubber dissolved in a petroleum distillate which is a non-solvent of polymerized chloroprene in the proportion of approximately one part by weight of rubber to seven parts by weight of petroleum distillate, the continuous and dispersed phases being present in the dispersion in the proportion of approximately seven parts by weight of the continuous phase, to one part by weight of the dispersed phase.

2. A cement in the form of a dispersion in which the continuous phase or dispersion medium is polymerized chloroprene dissolved in an aromatic solvent therefor, and the dispersed phase comprises microscopic droplets of a petroleum distillate which is a non-solvent of polymerized chloroprene having rubber dissolved therein in the proportion of approximately one part by weight of rubber to 7 parts by weight of petroleum distillate, the continuous and dispersed phases being present in the dispersion in the proportion of approximately 7 parts by weight of the continuous phase to one part by weight of the dispersed phase.

ROLAND D. EARLE.